United States Patent
Jeon et al.

(10) Patent No.: US 11,212,619 B2
(45) Date of Patent: Dec. 28, 2021

(54) ELECTRIC DEVICE HAVING SOUND OUTPUT MODULE

(71) Applicant: LG ELECTRONICS INC., Seoul (KR)

(72) Inventors: Taehwan Jeon, Seoul (KR); Joontae Kim, Seoul (KR); Junhan Park, Seoul (KR); Janghwan Shim, Seoul (KR); Byungkil Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/961,020

(22) PCT Filed: Jun. 27, 2018

(86) PCT No.: PCT/KR2018/007269
§ 371 (c)(1),
(2) Date: Jul. 9, 2020

(87) PCT Pub. No.: WO2019/146850
PCT Pub. Date: Aug. 1, 2019

(65) Prior Publication Data
US 2021/0067877 A1 Mar. 4, 2021

Related U.S. Application Data

(60) Provisional application No. 62/622,130, filed on Jan. 25, 2018.

(51) Int. Cl.
*H04R 9/06* (2006.01)
*G06F 3/16* (2006.01)
(Continued)

(52) U.S. Cl.
CPC ............... *H04R 9/06* (2013.01); *G06F 3/165* (2013.01); *H04R 1/028* (2013.01); *H04R 1/2811* (2013.01);
(Continued)

(58) Field of Classification Search
None
See application file for complete search history.

(56) References Cited

U.S. PATENT DOCUMENTS

2015/0108854 A1   4/2015   Akasaka
2021/0235179 A1*  7/2021   Lee ..................... H04R 9/025

FOREIGN PATENT DOCUMENTS

CN   1620189 A      5/2005
CN   201001193 Y    1/2008
(Continued)

*Primary Examiner* — Kenny H Truong
(74) *Attorney, Agent, or Firm* — Birch, Stewart, Kolasch & Birch, LLP

(57) ABSTRACT

A motor-integrated acoustic output unit, comprising: a speaker frame of which one surface and the other surface are open; a diaphragm covering an opening part of the one surface of the speaker frame and being coupled to the speaker frame; a yoke covering the other surface of the speaker frame; a motor unit which is coupled to the yoke and which has at least a portion positioned inside the speaker frame; a voice coil positioned on the circumference of the motor unit, vibrating in the directions of the one surface and the other surface, and causing the diaphragm to vibrate; and an outer magnet positioned outside the voice coil, wherein the motor unit comprises: a motor frame coupled to the yoke; a motor coil fixed to the motor frame; an elastic part of which one side is coupled to the motor frame; and a motor magnet coupled to the other side of the elastic part, implements speaker, receiver, and motor functions with one module so as to reduce a mounting space, thereby reducing (Continued)

the number of components such that a manufacturing process is simplified and manufacturing costs can be reduced.

13 Claims, 13 Drawing Sheets

(51) Int. Cl.

| | | |
|---|---|---|
| *H04R 1/02* | (2006.01) | |
| *H04R 1/28* | (2006.01) | |
| *H04R 3/00* | (2006.01) | |
| *H04R 5/02* | (2006.01) | |
| *H04R 5/04* | (2006.01) | |
| *H04R 7/12* | (2006.01) | |
| *H04R 7/18* | (2006.01) | |
| *H04R 9/02* | (2006.01) | |
| *H04R 9/04* | (2006.01) | |
| *H04R 31/00* | (2006.01) | |
| *H04S 1/00* | (2006.01) | |
| *G06F 3/14* | (2006.01) | |
| *H04B 1/3827* | (2015.01) | |

(52) U.S. Cl.
CPC ................ *H04R 3/00* (2013.01); *H04R 5/02* (2013.01); *H04R 5/04* (2013.01); *H04R 7/12* (2013.01); *H04R 7/18* (2013.01); *H04R 9/025* (2013.01); *H04R 9/046* (2013.01); *H04R 31/006* (2013.01); *H04S 1/007* (2013.01); *G06F 3/14* (2013.01); *H04B 1/3827* (2013.01); *H04R 2400/11* (2013.01); *H04R 2499/11* (2013.01); *H04R 2499/15* (2013.01)

(56) References Cited

FOREIGN PATENT DOCUMENTS

| | | |
|---|---|---|
| CN | 205793289 U | 12/2016 |
| JP | 2003-125474 A | 4/2003 |
| KR | 20-0387738 Y1 | 6/2005 |
| KR | 10-2006-0058204 A | 5/2006 |
| KR | 10-0663917 A | 1/2007 |
| KR | 10-0688794 A | 3/2007 |
| KR | 10-0896514 B1 | 5/2009 |
| KR | 10-1817102 B1 | 1/2018 |

\* cited by examiner (a)

(b)

(a)

(b)

(a)

(b)

(a)

(b)

(a)

(b)

ELECTRIC DEVICE HAVING SOUND OUTPUT MODULE

CROSS REFERENCE TO RELATED APPLICATIONS

This application is the National Phase of PCT/KR2018/007269 filed on Jun. 27, 2018, which claims priority under 35 U.S.C. § 119(e) to U.S. Provisional Application No. 62/622,130 filed on Jan. 25, 2018, all of which are hereby expressly incorporated by reference into the present application.

TECHNICAL FIELD

The present disclosure relates to a mobile terminal that improves a quality of low-pitched sound by expanding a resonance space of an audio output module.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

As multimedia functions of the mobile terminal are diversified, the number of parts mounted inside the mobile terminal increases, and as a performance of each part improves, a size of the part changes.

DISCLOSURE

Technical Problem

The present disclosure is to provide a mobile terminal that sufficiently secures a resonance space of an audio output module to improve a quality of sound output from the audio output module. In addition, the present disclosure is to provide a mobile terminal capable of strengthening a weak point of a conventional audio output module by utilizing not only a diaphragm of the audio output module, but also a display unit of the mobile terminal.

Technical Solutions

Provided is a motor-integrated audio output module including a speaker frame having one surface and the other surface that are opened; a diaphragm for covering an opening of one surface of the speaker frame to be coupled to the speaker frame, a yoke for covering the other surface of the speaker frame, a motor coupled to the yoke and at least partially positioned inside the speaker frame, a voice coil located around the motor, wherein the voice coil vibrates in directions of one surface and the other surface to generate a vibration of the diaphragm, and an outer magnet located outward of the voice coil, wherein the motor includes a motor frame coupled to the yoke, a motor coil fixed to the motor frame, an elastic portion having one side coupled to the motor frame, and a motor magnet coupled to the other side of the elastic portion.

The motor-integrated audio output module may have a rectangular shape with long-sides and short-sides, wherein the motor-integrated audio output module may further include a reinforcing magnet positioned between the voice coil and the motor in a direction of the long-side.

The outer magnet may include a plurality of outer magnets arranged along an inner perimeter of the speaker frame.

The motor-integrated audio output module may further include a plurality of resonance holes defined in the speaker frame, wherein the resonance hole may be defined at a position between adjacent two of the plurality of outer magnets.

The motor frame may include a shaft protruding in the direction of one surface, wherein the motor coil is wound around the shaft, wherein the motor magnet may be in a shape of a donut located outward of the motor coil.

The yoke may have an opening of a size corresponding to the motor defined therein, wherein the motor-integrated audio output module may further include an injection molded portion located around the opening to fasten the motor with the yoke.

The injection molded portion may cover an outer circumference of the opening of the yoke, wherein the motor frame may further include a wing protruding laterally and in contact with the injection molded portion to fix the motor.

The yoke may further include a motor groove dented in a size corresponding to the motor, wherein the motor may be inserted into the motor groove.

The yoke may further include a motor groove dented in a size corresponding to the motor, wherein one surface of the motor frame may be opened, wherein the motor frame may further include a wing coupled to a circumference of the motor groove, and wherein the motor groove may cover the open one surface of the motor frame.

The motor-integrated audio output module may further include a weight coupled to the motor magnet, wherein a size of the weight may correspond to a size of the motor groove.

Provided is a mobile terminal including a case including a sound hole defined at one side thereof, a display unit coupled to a front surface of the case, an audio output module located inside the case to be adjacent to the sound hole, and a controller that outputs an image by controlling the display unit and output sound by controlling the audio output module, wherein the audio output module includes a speaker frame having one surface and the other surface that are opened, a diaphragm for covering an opening of one surface of the speaker frame to be coupled to the speaker frame, a yoke for covering the other surface of the speaker frame, a motor frame coupled to the yoke and at least partially located inside the speaker frame, a voice coil located around the motor frame, wherein the voice coil vibrates in directions of one surface and the other surface to generate a vibration of the diaphragm, an outer magnet located outward of the voice coil, a motor coil fixed to the motor frame, an elastic portion having one side coupled to the motor frame, and a motor magnet coupled to the other side of the elastic portion.

The motor frame of the audio output module may be in contact with a rear surface of the display unit to transmit a vibration resulted from a movement of the motor magnet to the display unit.

The mobile terminal may further include a middle frame positioned inside the case to support the rear surface of the display unit, wherein the motor frame may protrude in the direction of the other surface of the speaker frame more than the yoke, wherein the motor frame may be inserted into an opening defined in the middle frame to be in contact with the display unit.

The yoke may be in contact with the middle frame.

The mobile terminal may further include a plurality of resonance holes defined in the speaker frame, wherein the outer magnet may include a plurality of outer magnets spaced apart from each other and arranged along an inner perimeter of the speaker frame, wherein the resonance hole may be defined at a position between adjacent two of the plurality of outer magnets.

The audio output module may have a rectangular shape with long-sides and short-sides, wherein the mobile terminal may further include a reinforcing magnet positioned between the voice coil and the motor frame in a direction of the long-side.

The motor frame may include a shaft protruding in the direction of one surface, wherein the motor coil is wound around the shaft, wherein the motor magnet may be in a shape of a donut located outward of the motor coil.

The yoke may have an opening of a size corresponding to the motor frame defined therein, wherein the mobile terminal may further include an injection molded portion for fastening the motor frame with the yoke, wherein the injection molded portion may cover an outer circumference of the opening of the yoke, and wherein the motor frame may further include a wing protruding laterally and in contact with the injection molded portion to fix the motor frame.

The yoke may further include a motor groove dented in a size corresponding to the motor frame, wherein the motor frame may be inserted into the motor groove.

The yoke may further include a motor groove dented in a size corresponding to the motor, wherein one surface of the motor frame may be opened, wherein the motor frame may further include a wing coupled to a circumference of the motor groove, and wherein the motor groove may cover the open one surface of the motor frame.

The mobile terminal may further include a weight coupled to the motor magnet, wherein a size of the weight may correspond to a size of the motor groove.

One surface of the motor frame facing the diaphragm may be opened, wherein the controller may adjust voltages respectively applied to the voice coil and the motor coil to limit a vibration range of the diaphragm and a vibration range of a weight and the motor magnet when power is applied to the voice coil and the motor coil at the same time.

The sound hole may include at least two sound holes and the audio output module may include at least two audio output modules, wherein the controller may drive the plurality of audio output modules at the same time to output stereo sound.

Advantageous Effects

The motor-integrated audio output module according to the present disclosure may reduce a mounting space by implementing functions of the speaker, the receiver, and the motor using one module and may simplify a manufacturing process and reduce a manufacturing cost by reducing the number of parts.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BEST MODE

Figure 1A:
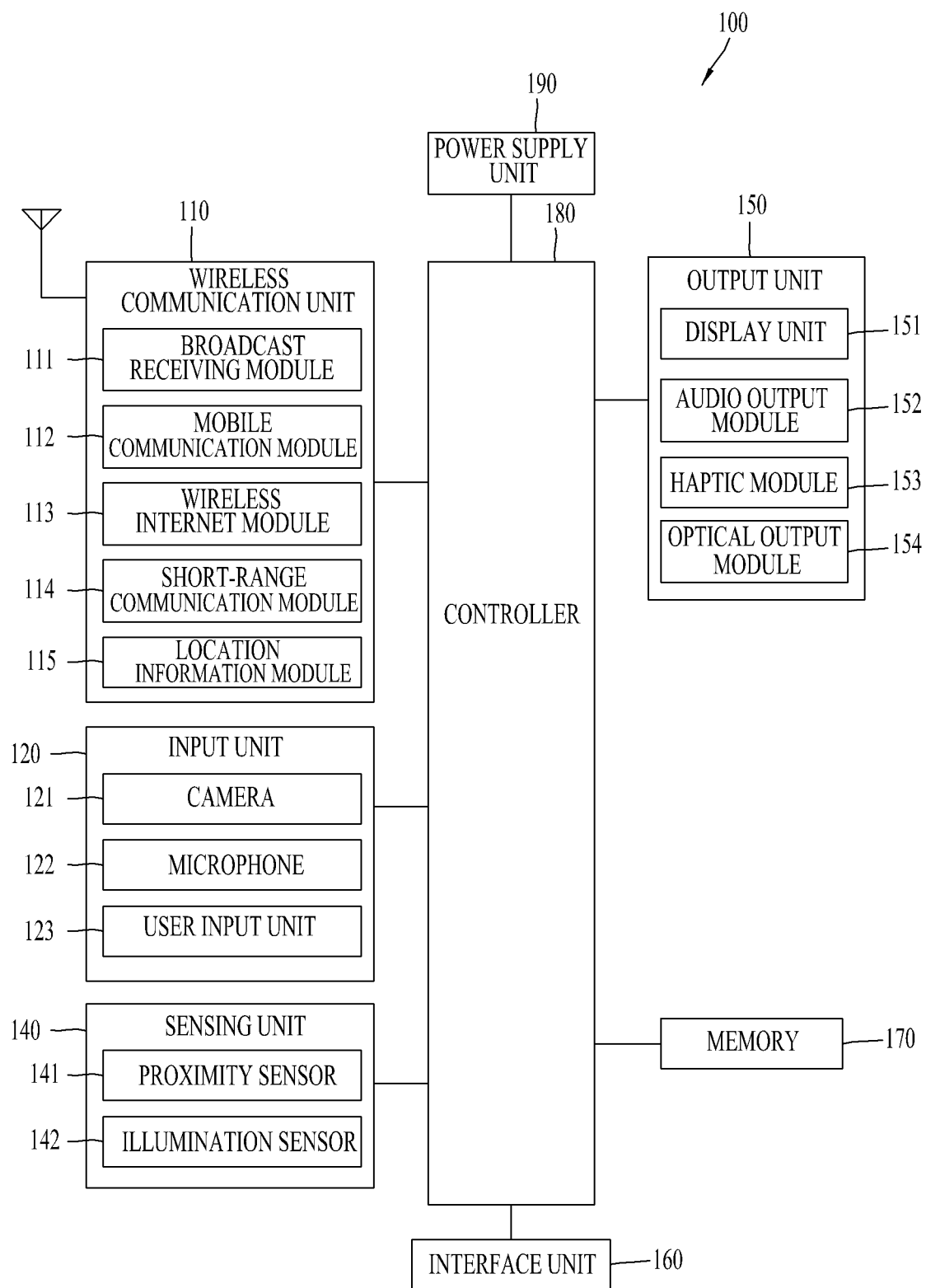
FIG. 1A is a block diagram of a mobile terminal in accordance with the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
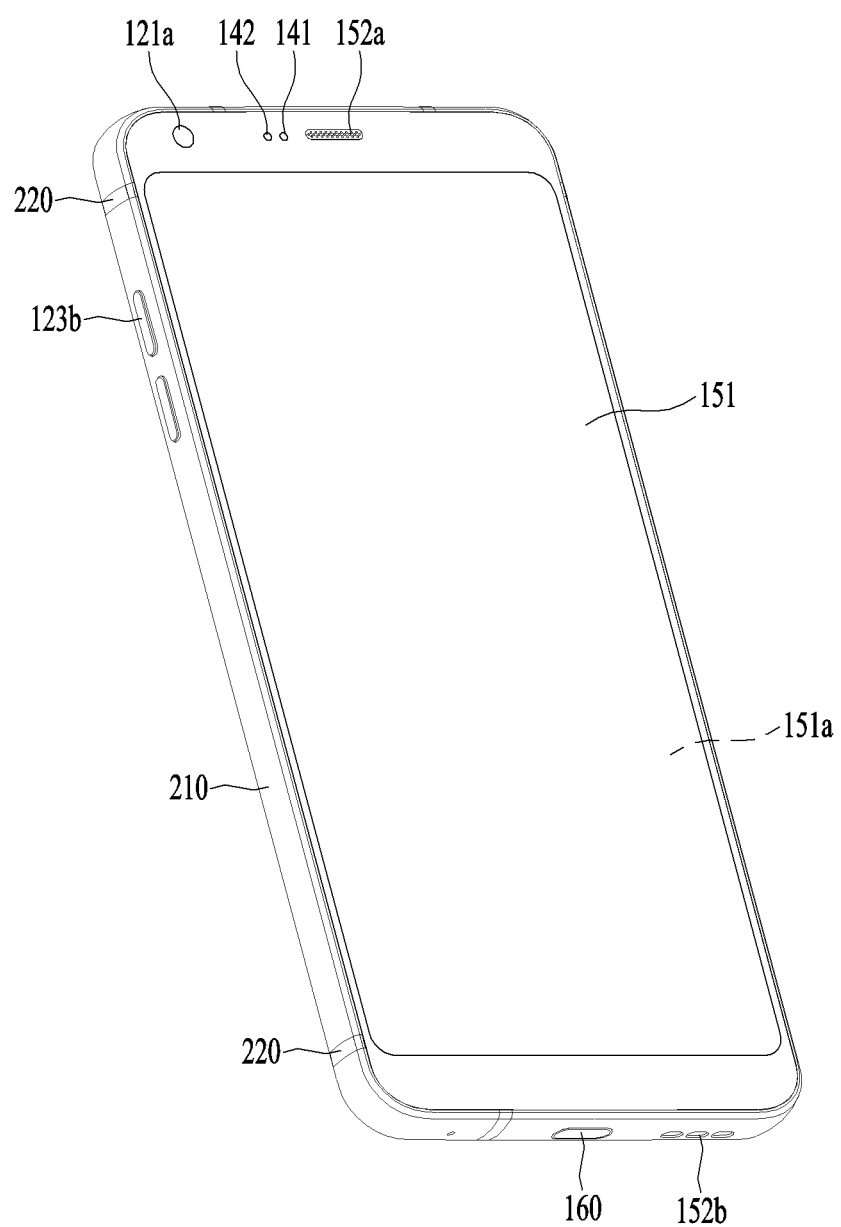
FIGS. 1B and 1C are conceptual views of one example of the mobile terminal, viewed from different directions.
Figure 1C:
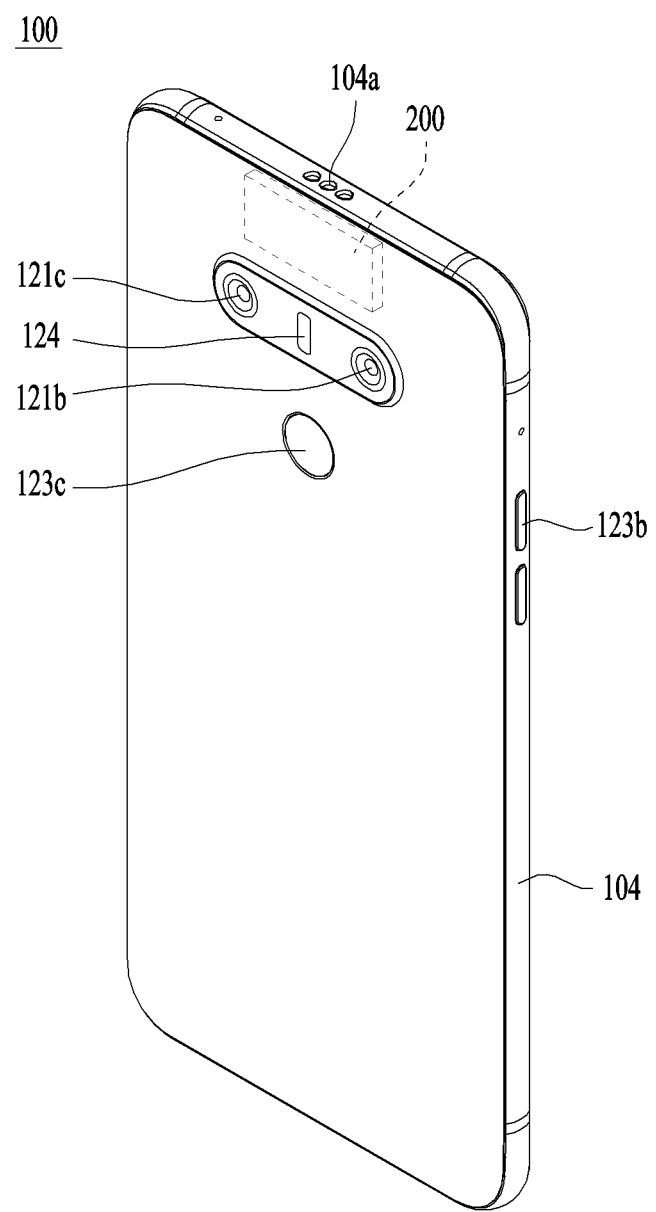

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. Referring now to FIG. 1A, the mobile terminal 100 is shown having wireless communication unit 110 configured with several commonly implemented components. It is understood that implementing all of the illustrated components is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The audio output module 152 converts an electrical signal into sound. A dynamic type audio output module that generates sound through a vibration of a diaphragm using an electromagnetic force between a sound coil and a magnet is mainly used.

According to an embodiment illustrated in FIGS. 1B and 1C, both a receiver type and a speaker type may be implemented using a sound hole 104a defined in a side case 104 and one audio output module. In particular, there is no need to define an opening in a window 151a on a front surface by omitting a sound hole defined in a front surface direction in the prior art, so that a durability of the window 151a may be improved and defects occurring during window manufacturing and the number of manufacturing processes may be reduced.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1A. Moreover, the controller 180 may be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Referring now to FIGS. 1B and 1C, the mobile terminal 100 is described with reference to a bar-type terminal body. However, the mobile terminal 100 may alternatively be implemented in any of a variety of different configurations.

Here, the terminal body may be understood to refer to the concept of this bore a mobile terminal 100 to at least one of the aggregate.

The mobile terminal 100 will generally include a case (for example, frame, housing, cover, and the like) forming the appearance of the terminal. Conventionally, a front surface and a rear surface of the mobile terminal 100 are respectively formed using a front case and a rear case, and electronic parts are mounted in an internal space between the front case and the rear case. However, recently, a shape in which, as a size of the display unit 151 increases, a large portion of the front surface is occupied by the display unit 151, and a size of the window 151a that protects the front surface of the display unit 151 is extended to cover an entirety of the front surface of the mobile terminal 100 is also used. In this connection, an outer portion of a rear case 102 protrudes toward the front surface to cover a side surface of the mobile terminal 100.

Instead of omitting the front case, a middle frame 105 for reinforcing a rigidity of the mobile terminal 100 while supporting the rear surface of the display unit 151 may be disposed. The electronic parts may be mounted on a rear surface of the middle frame 105 and the rear case may be coupled to the rear surface of the middle frame 105 to form a housing of the mobile terminal 100.

A side case 104 that covers the side surface of the mobile terminal 100 may be separately disposed, and the side case 104 may be integrally formed with the above-described middle frame 105. That is, a portion exposed to the outside of an outer portion of the middle frame 105 may be the side case 104. When the side case 104 contains a metal material, the side case 104 may be used as a portion of an antenna, and the rear case 102 may use a material different from that of the side case 104. A design in which a metal or a glass material is applied to the rear case 102 has been adopted.

As described above, the housing forming an exterior of the mobile terminal 100 includes the plurality of cases 102 and 104 and the window 151a. Water may flow into a gap between each of the cases 102 and 104 and the window 151a. For waterproofing, a waterproof tape, a waterproof bond, a resin, a rubber, or a waterproof ring 108 made of an elastic material that shields each of the cases 102 and 104 and the window 151a of the mobile terminal 100 from each other may be used to prevent the water from entering the internal space where the parts are mounted. As functions of the mobile terminal 100 are diversified, a waterproof function is becoming an essential function because the mobile terminal 100 is used even in a swimming pool or a rainy situation.

A display unit 151 may be disposed on the front surface of the mobile terminal 100. In order to increase the size of the display unit 151 on the front surface, the sound hole for the audio output module defined in a top of the conventional mobile terminal 100, the proximity sensor, the illumination sensor, the optical output module, a first camera, and the like are omitted or arranged at other positions.

A side surface input unit 123b, the microphone 122, and the interface unit 160 are arranged on the side surface of the mobile terminal 100. The mobile terminal 100 having a camera 121b and a rear surface input unit 123c arranged on a rear surface of the terminal body will be described as an example. Without being limited to such arrangement, a side surface input unit 123b, the microphone 122, and the interface unit 160 may be omitted or arranged on the rear surface or the front surface of the mobile terminal 100.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. The controller 180 may control the optical output module 154 such that output of the light is terminated when the identification of the event by the user is sensed.

The camera 121b processes image frames of a still image or a moving image obtained by an image sensor in a shooting mode or a video call mode. The processed image frame may be displayed on the display unit 151 and may be stored in the memory 170.

A content input through the front surface input unit and the side surface input units 123a and 123b may be variously set. For example, the front surface input unit may receive commands such as a menu, a home key, cancel, search, and the like, and the side surface input unit 123b may receive commands such as adjustment of a volume of the sound output from the audio output module 152, switch to a touch recognition mode of the display unit 151, and the like.

In one example, as another example of the user input unit 123, a rear surface input unit 123c may be disposed on the rear surface of the terminal body. Such rear surface input unit 123c is manipulated to receive a command for controlling an operation of the mobile terminal 100. An input content may be variously set. For example, commands such as power on/off, start, termination, scroll, and the like, and the commands such as the adjustment of the volume of the sound output from the audio output module 152, the switch to the touch recognition mode of the display unit 151, and the like may be received. The rear surface input unit 123c may be implemented in a form in which a touch input, a push input, or an input by a combination thereof is available.

The rear surface input unit 123c may be disposed to overlap the display unit 151 of the front surface in a thickness direction of the terminal body. For example, the rear surface input unit 123c may be disposed at a top of the rear surface of the terminal body such that the user may easily manipulate the rear surface input unit 123c using an index finger when holding the terminal body with one hand. However, the present disclosure may not be necessarily limited thereto, and a position of the rear surface input unit 123c may be changed.

Embodiments that include the rear input unit 123c may implement some or all of the functionality of the front input unit in the rear input unit. As such, in situations where the front input unit is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage. The second camera 121b is shown located at the rear side of the terminal body. The camera disposed on the rear surface may further include a camera having different characteristics (such as a camera with a wide-angle lens, a fish-eye lens, an infrared camera, or the like), or may acquire an image of a different viewing angle through at least two cameras 121b and 121b.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown located adjacent to the second camera 121b. When an image of a subject is captured with the camera 121b, the flash 124 may illuminate the subject.

At least one antenna for wireless communication may be located on the terminal body. The antenna may be installed in the terminal body or formed by the case. For example, an antenna which configures a part of the broadcast receiving module 111 (see FIG. 1A). may be retractable into the terminal body. Alternatively, an antenna may be formed using a film attached to an inner surface of the rear case 102, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen Further preferred embodiments will be described in more detail with reference to additional drawing figures. It is understood by those skilled in the art that the present features can be embodied in several forms without departing from the characteristics thereof.

Figure 2:
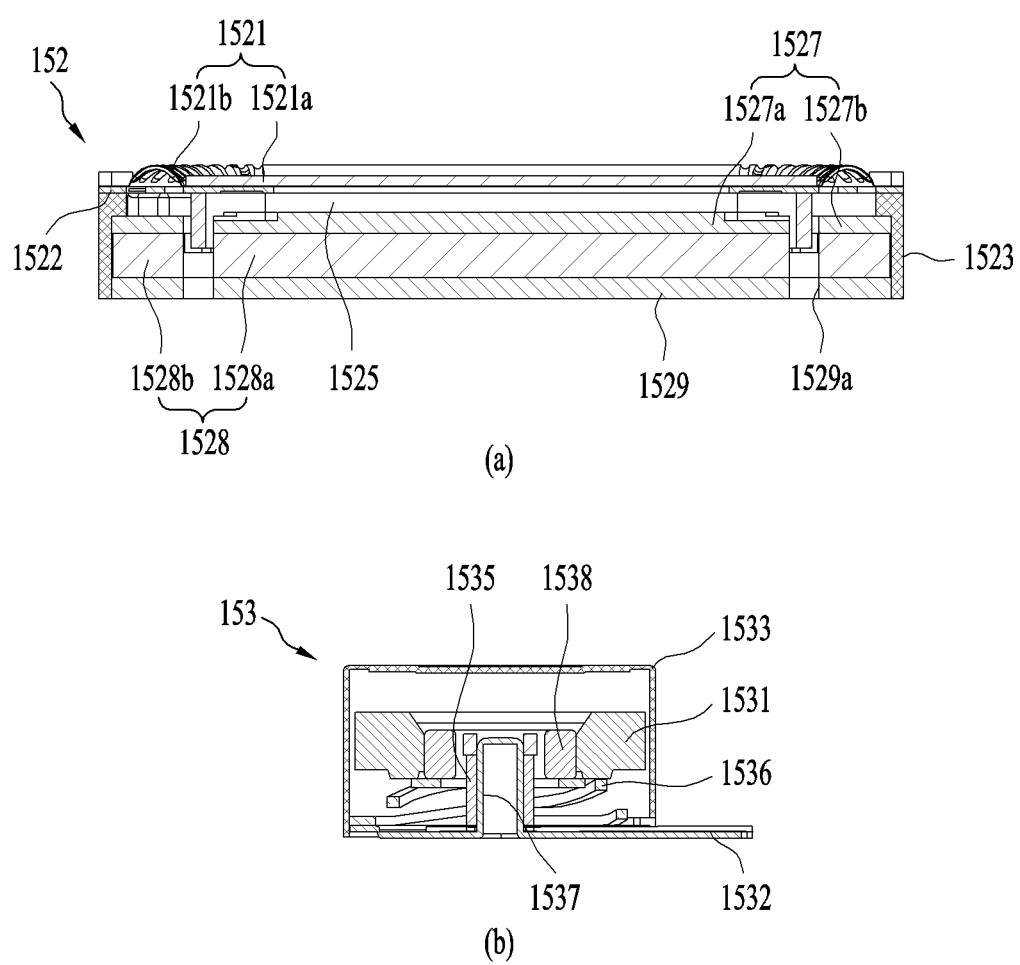
FIG. 2 is a view illustrating cross-sections of conventional speaker module and motor module.

FIG. 2A is a cross-sectional view illustrating a speaker module 152. The conventional speaker module 152 includes a speaker frame 213 surrounding a perimeter of a side surface of the speaker module 152, a diaphragm 211 coupled to one surface of the speaker frame 213, and a yoke 219 coupled to the other surface of the speaker frame 213. A voice coil 215 and a magnet 218 forming a magnetic field are positioned between the diaphragm 211 and the yoke 219.

The magnet 218 is a member having a magnetic force such that the voice coil 215 is located in the magnetic field. When only one magnet 218 is disposed outward of the coil, because the magnetic field is weak, a magnet disposed inward of the coil may be further included. That is, an outer magnet 218b and a center magnet 218b are included, and the voice coil 215 is located in a magnetic field formed between the outer magnet 218b and the center magnet 218b. The yoke 219 is a member for forming a magnetic path of the magnetic field formed by the magnet. Mild steel is mainly used as the yoke 219, and recently, synthetic resin such as melamine resin is also used as the yoke 219.

When a current flows through the voice coil 215, the voice coil 215 moves in up and down directions in the drawing by the magnetic field, and the diaphragm 211 generates sound while vibrating in response to the movement of the voice coil 215. An analog sound is generated from a digital signal.

FIG. 2B is a view illustrating a conventional motor module 153. A motor module 210 includes a motor magnet 228 and a motor coil 225 mounted inside the motor frame 223. In the present embodiment, the motor coil 225 is fixed and the motor magnet 228 is coupled by the elastic portion 226, so that a position of the elastic portion 226 may be varied. When a current flows through the motor coil 225 located in the magnetic field of the motor magnet 228, the motor coil 225 applies a force opposite to the magnetic field formed by the motor magnet 228 to the motor magnet 228, so that the motor magnet 228 may move in the up and down directions in the drawing.

In the motor module 153, a moving portion must have a weight in order to apply a vibration. In addition, although the motor magnet 228 does not need to be connected to the controller, the motor coil has to be connected to the controller and receive the current. Thus, the motor magnet 228 may be movably disposed. When the weight of the motor magnet 228 is insufficient, a weight 221 may be additionally coupled to increase a magnitude of the vibration.

Because the conventional mobile terminal 100 has both the speaker module 152 and the motor module 153 as described above, it was difficult to secure a space in the mobile terminal 100. Because the conventional mobile terminal 100 also includes the magnet, other internal parts may be affected by the magnet, so that it was difficult to select a placement position of the magnet.

In order to solve such problems, a motor-integrated audio output module 200 provides functions of the audio output module and the motor.

Figure 3:
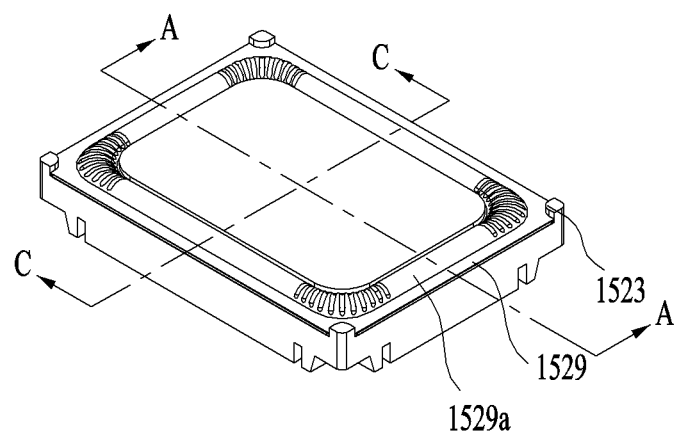
FIG. 3 is conceptual views of a motor-integrated audio output module of the present disclosure, viewed from different directions.
Figure 3:
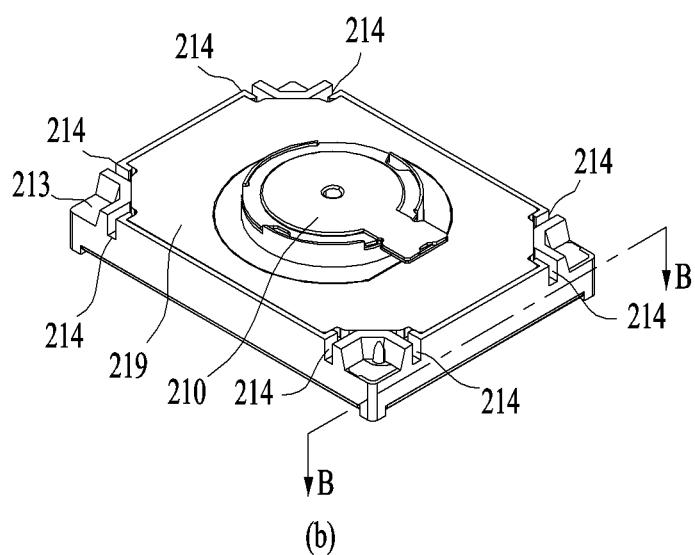

FIG. 3 is conceptual views of a motor-integrated audio output module of the present disclosure, viewed from different directions. FIG. 3A illustrates a direction of one surface where the diaphragm is located. The diaphragm is connected to the sound hole 104a such that the sound is directly output through the sound hole 104a defined in the mobile terminal case. In FIG. 3B, the yoke covers the motor-integrated audio output module in a direction of the other surface, and the motor is located at a center of the motor-integrated audio output module.

Figure 4:
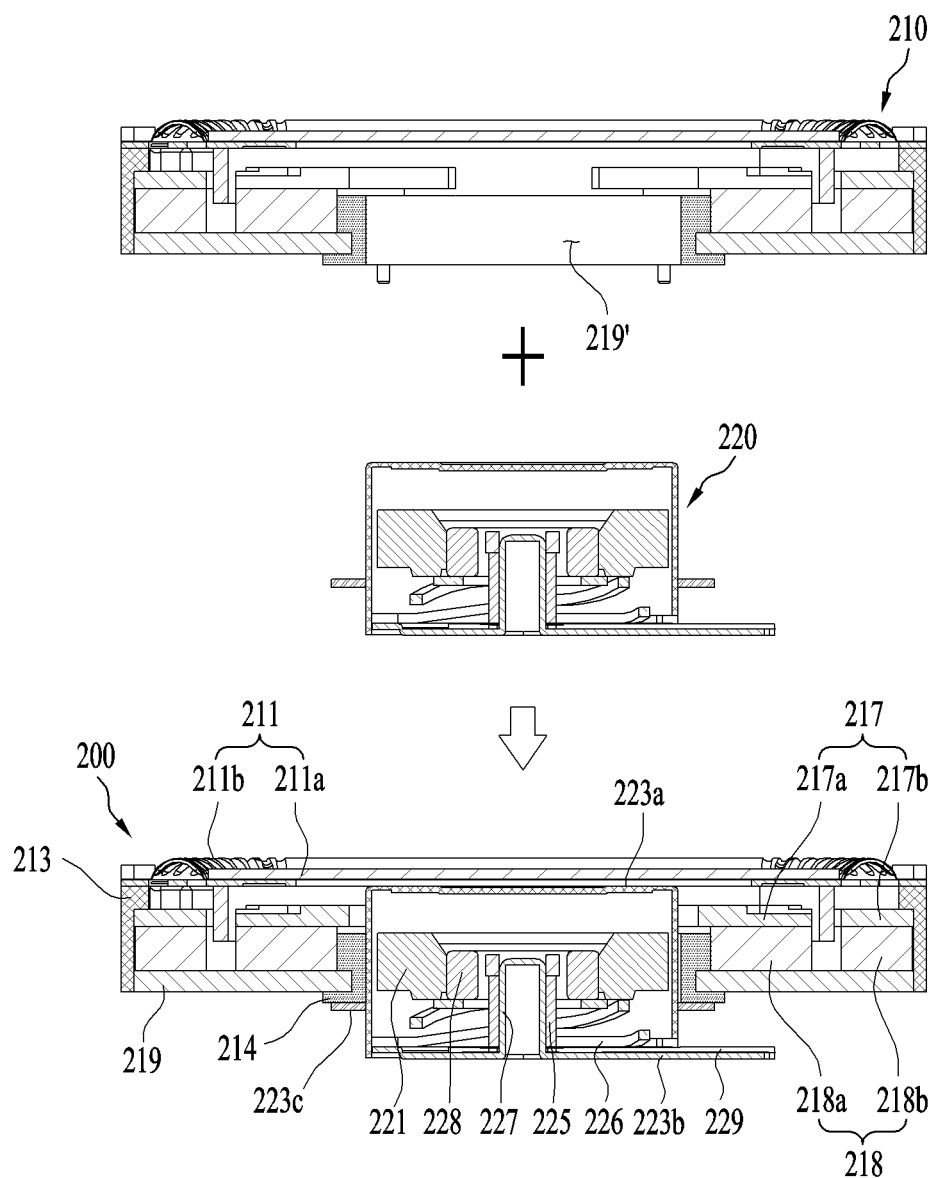
FIG. 4 is a cross-section taken along a line A-A of FIG. 3 of the present disclosure.
Figure 5:
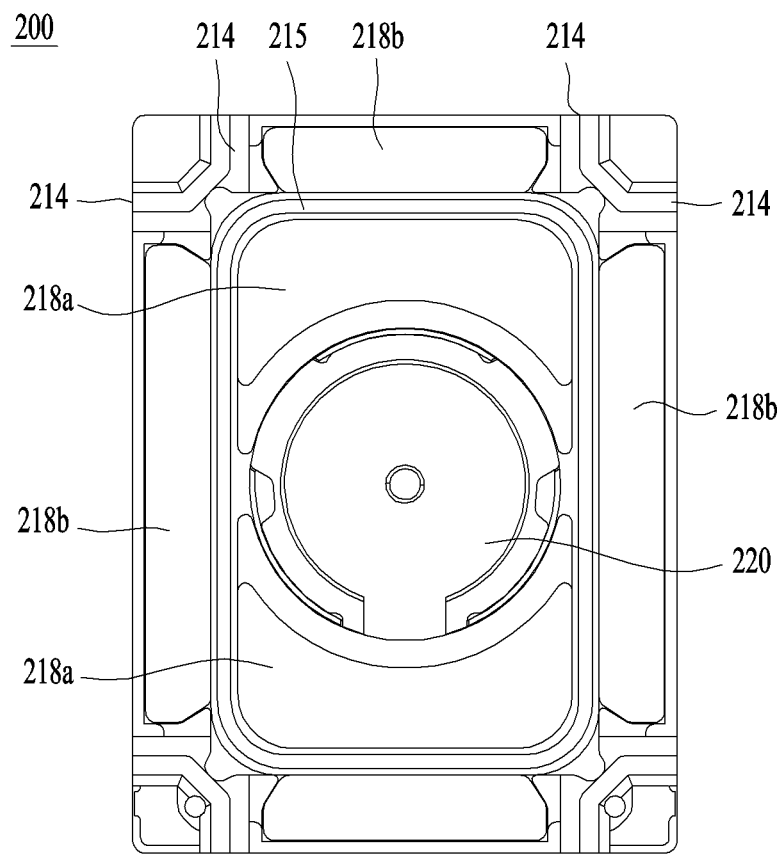
FIG. 5A is a cross-section taken along a line B-B of FIG. 3
FIG. 5B is a cross-section taken along a line C-C of FIG. 3.
Figure 5:
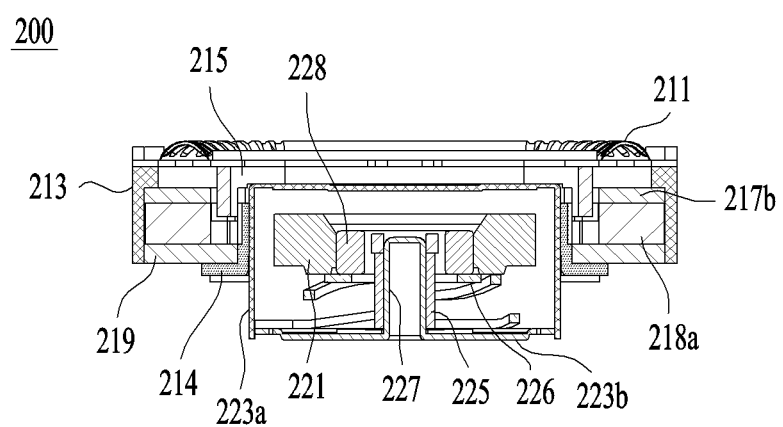
Figure 6:
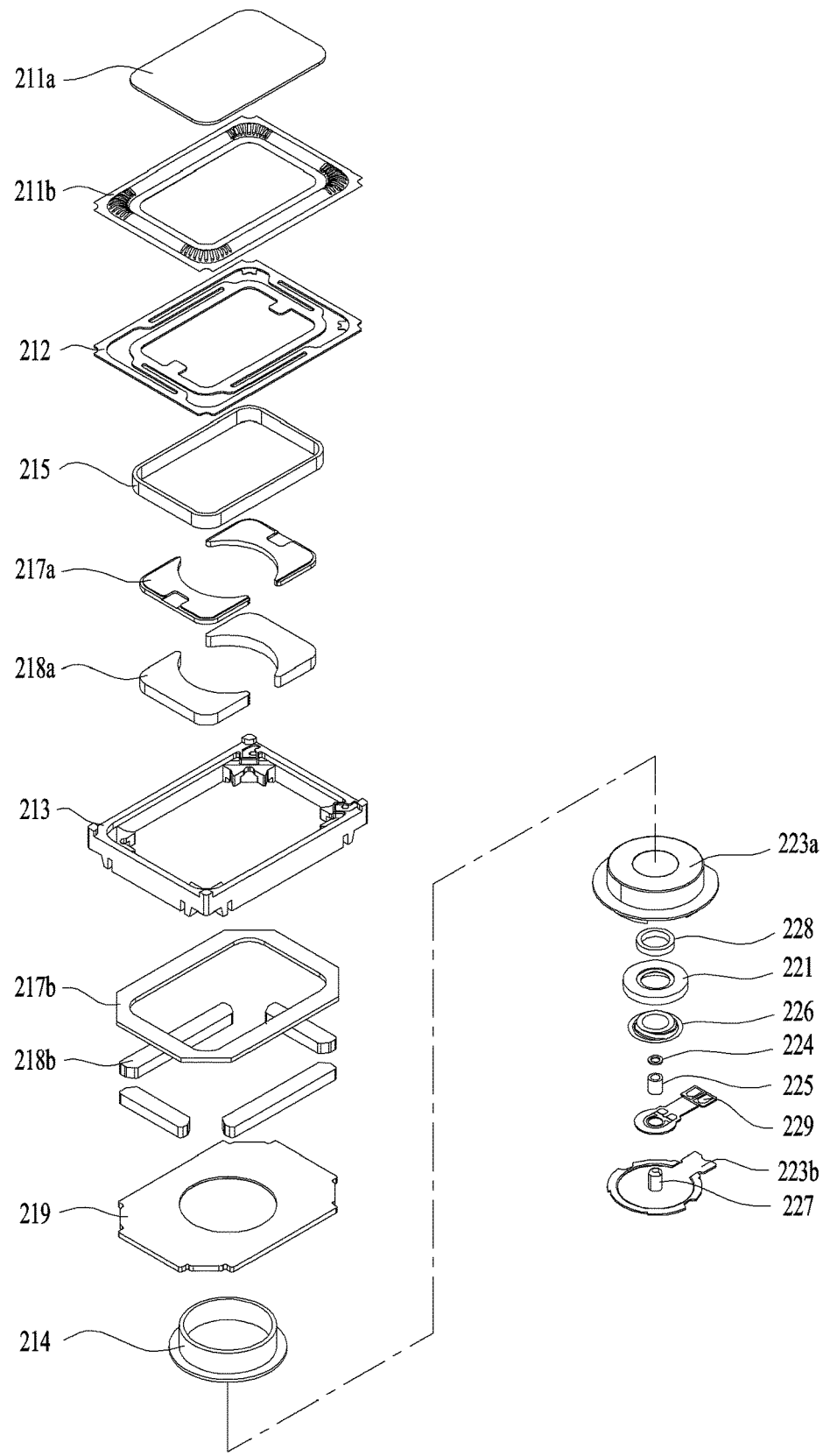
FIG. 6 is an exploded perspective view of a motor-integrated audio output module of the present disclosure.

FIG. 4 is a cross-section taken along a line A-A of FIG. 3 of the present disclosure. In addition, FIG. 5A is a cross-section taken along a line B-B of FIG. 3 and FIG. 5B is a cross-section taken along a line C-C of FIG. 3. In addition, FIG. 6 is an exploded perspective view of a motor-integrated audio output module of the present disclosure.

Referring to FIG. 4, the audio output module 200 of the present disclosure is composed of a speaker 210 and a motor 220. The audio output module 200 may be implemented by inserting the motor 220 into a portion into which the center magnet is disposed at a center of a conventional speaker. A portion of the yoke 219 on the other surface may be cut to insert the motor 220 in order not to affect the diaphragm 211 on one surface of the speaker frame 213.

Because the motor 220 is disposed biased toward the other surface so as not to be in contact with the diaphragm 211 when the diaphragm 211 is vibrating, the motor 220 may protrude in a direction of the other surface of the speaker 210. That is, the motor 220 may protrude from the other surface of the speaker 210 formed by the yoke 219 as shown in FIG. 4.

The audio output module of the present disclosure includes the speaker frame 213 surrounding a perimeter of a side surface of the audio output module. The speaker frame 213 may be manufactured in an injection molding scheme. The diaphragm 211 for covering one surface of the speaker frame 213 is formed in a thin film shape. A center diaphragm 211a located at a center portion may be flat and an outer diaphragm 211b surrounding an outer portion of the center diaphragm may have a curved surface. The center diaphragm 211a and the outer diaphragm 211b may have different thicknesses or be formed by bonding different materials.

The voice coil 215 is a member formed by winding a thin conducting wire. When a current flows through the voice coil 215 when the voice coil 215 is in the magnetic field, the voice coil 215 vibrates in the up and down directions by an induced electromotive force. A suspension 212 may be disposed to transmit such vibration to the diaphragm 211. The suspension 212 may serve to transmit the vibration of the voice coil 215 to the diaphragm 211.

The magnet may include the outer magnet 218b and may be positioned along a perimeter of the voice coil 215 along the speaker frame 213. As shown in FIGS. 5 and 6, the outer magnet 218b of the present disclosure may not be in a continuous form. In addition, a plurality of pieces of the outer magnet 218b may be arranged along the perimeter of the voice coil 215. As shown in FIG. 5, in a case of a rectangular audio output module, four outer magnets 218b respectively corresponding to four sides except for corners may be arranged.

The motor 220 generates the vibration using the force applied when the current flows based on the Fleming's left hand rule through the electromagnetic field between the motor coil 225 and the motor magnet 228. One of the motor coil 225 and the motor magnets 228 must be fixed to the mobile terminal 100. Thus, one of the motor coil 225 and the motor magnets 228 may be coupled to the motor frame 223. That is, the motor coil 225 is wound on a shaft 227 protruding from a lower motor frame 223b, and one end of the elastic portion 226 is coupled to the motor frame 223. The motor magnet 228 coupled to the other end of the elastic portion 226 may have a shape of a donut surrounding the shaft 227.

The weight 221 additionally coupled to the magnet may also have the donut shape and may be formed in a circular shape so as not to be biased toward one side during the vibration. As weights of the weight 221 and the magnet increase and as the intensity of the current increases, the magnitude of the vibration increases. It is advantageous to increase the weight of the weight 221 to obtain a vibration of a large magnitude with less energy.

The motor 220 is not able to enter a vibration range of the diaphragm 211 in one surface direction, so that the motor 220 protrudes in the direction of the other surface of the speaker 210. In addition, an opening may be defined in the yoke 219 that covers the other surface of the speaker frame 213 to insert the motor 220 in the opening. In order to limit a position where the motor 220 is inserted into the speaker frame 213 such that the motor 220 is not in contact with the diaphragm 211, a wing 223c protruding outward of the motor frame 223 may be further included.

Because the wing 223c has a diameter larger than that of an opening 219' of the yoke 219, the position where the motor 220 is inserted may be limited. In order to stably insert the motor 220 without breaking the yoke 219, an injection molded product positioned around the opening of the yoke 219 may be further included, and the motor 220 may be coupled to the injection molded product.

In order to apply power to the motor coil 225, the motor coil 225 should be connected to the controller of the mobile terminal 100, so that a motor substrate 229 for connecting the motor coil 225 to the controller may be further included. A yoke 224 may be further included as a path along which a magnetic force formed by the motor magnet 228 flows. When the motor frame 223b is made of a material such as soft iron, the motor frame 223b may also serve as the path along through which the magnetic force flows like the yoke.

Referring to FIG. 4, the voice coil 215 is disposed around the motor magnet 228. That is, the motor magnet 228 may partially perform a role that the center magnet played in the conventional speaker, so that the motor magnet 228 may provide the vibration of the mobile terminal 100 together with the motor coil 225 or apply the vibration of the diaphragm 211 together with the voice coil 215.

However, because a size of the motor magnet 228 is small compared to a size of the conventional center magnet, when using the rectangular speaker frame 213 as shown in FIG. 5, a clearance is defined between the motor 220 and the speaker coil 215 in a long-side direction. An auxiliary magnet 218a may be further disposed in the clearance between the motor 220 and the speaker coil 215. In order to place the auxiliary magnet 218a in a maximum area in a limited space, one side of the auxiliary magnet 218a may be concavely formed in a semicircle shape based on the shape of the motor frame 223, and the other side of the auxiliary magnet 218a may be formed to correspond to the shape of the voice coil 215.

Figure 7:
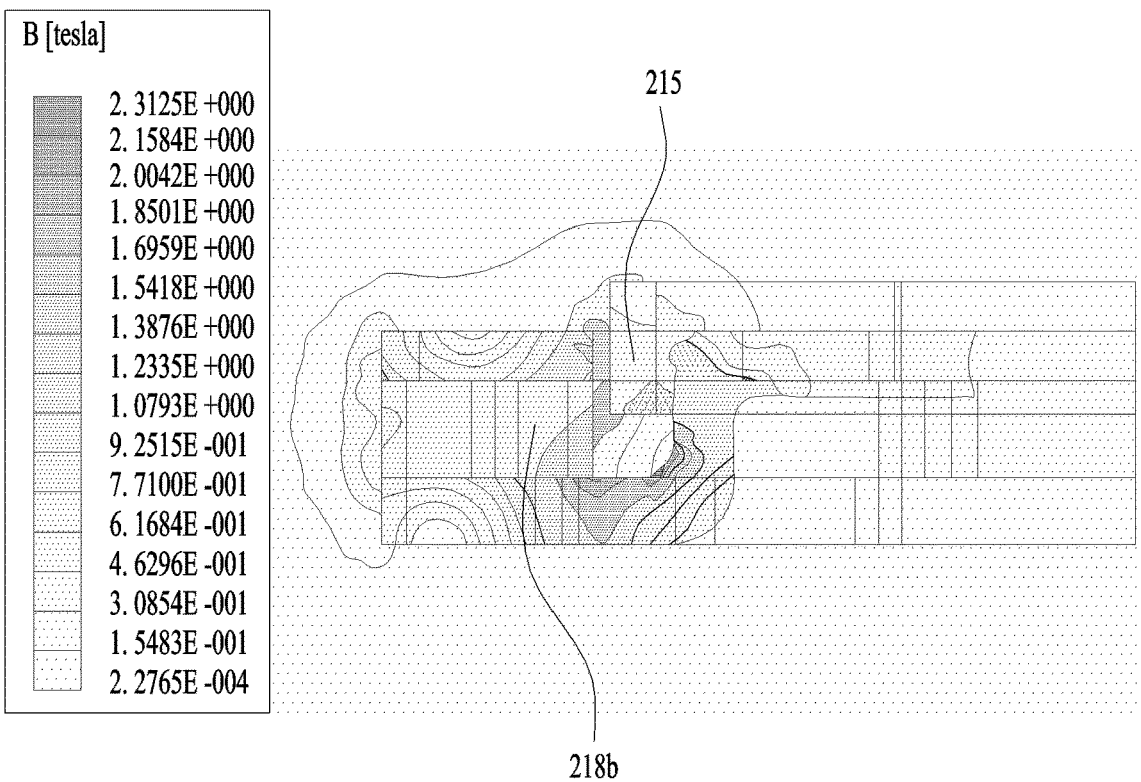
FIG. 7 is a view for comparing intensities of speakers based on presence or absence of an auxiliary magnet of a motor-integrated audio output module of the present disclosure.
Figure 7:
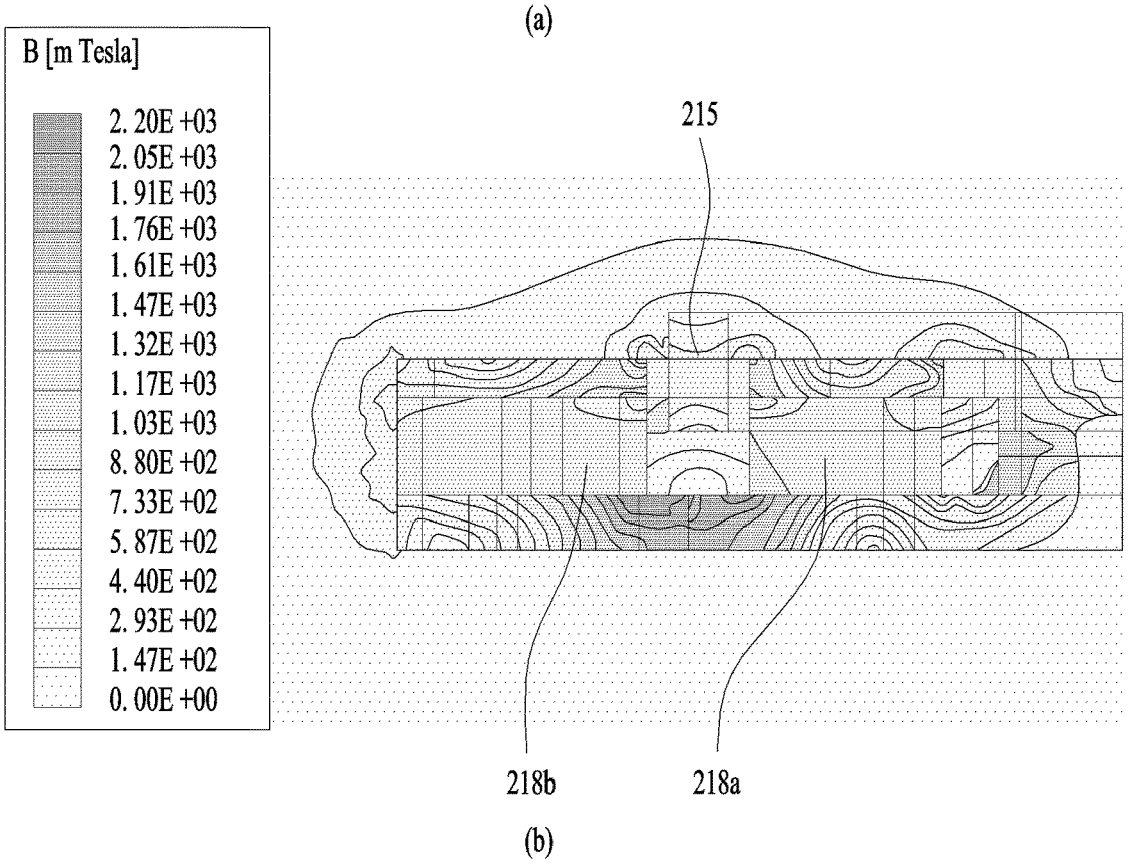

FIG. 7 is a view for comparing intensities of speakers based on presence or absence of the auxiliary magnet 218a of the motor-integrated audio output module of the present disclosure. FIG. 7A illustrates a strength of a magnetic field when there is no auxiliary magnet 218a, and FIG. 7B illustrates a strength of a magnetic field when the auxiliary magnet 218a is present. In FIG. 7B, a magnetic field wider than that in FIG. 7A is formed around the coil. As the number of magnets increases, the size of the magnetic field increases. Thus, the magnetic field in FIG. 7B may have a force factor (BL) of about 2 times that of the case in which there is no auxiliary magnet 218a.

A driving force for moving the diaphragm 211 is generated by an interaction of a magnetic field formed by a current flowing through a magnetic field B and the voice coil 215. Therefore, the driving force of the audio output module may be represented as a product of the magnetic field B of the magnet, a current i flowing through the voice coil, and a total length L of the voice coil 215. Because the current is input from the outside, the current is variable. Thus, a performance of the audio output module itself may be represented as BL, which is a product of the magnetic field of the magnet and the length of the voice coil 215. That is, when the BL is great, a speaker with a greater output may be implemented.

In addition to the yoke 219 located on the other surfaces of the outer magnet 218b and auxiliary magnet 218a, a top plate 217 may be disposed for a magnetic path in a direction of one surface of each of the outer magnet 218b and the auxiliary magnet 218a. The yoke 219 is in contact with both the outer magnet 218b and the auxiliary magnet 218a, but the voice coil 215 is located between the outer magnet 218b and the auxiliary magnet 218a, so that the top plate 217 may be divided into an outer top plate 217b and a center top plate 217a.

The motor 220 may also include the yoke 219 on one side of the motor magnet 228 for the magnetic path of the magnetic field formed by the motor magnet 228, and the motor frame 223 on which the shaft 227 is formed may also serve as the magnetic path.

Figure 8:
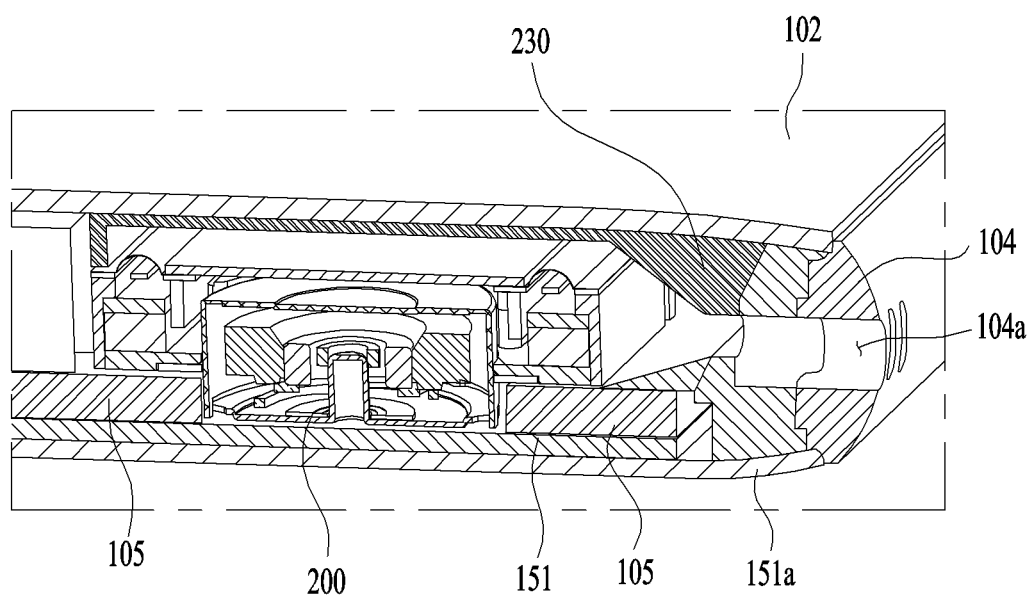
FIG. 8 is a cross-sectional perspective view illustrating a state in which a motor-integrated audio output module of the present disclosure is mounted on a mobile terminal.

FIG. 8 is a cross-sectional perspective view illustrating a state in which the motor-integrated audio output module 200 of the present disclosure is mounted on the mobile terminal 100. One surface of the speaker frame 213 may face the rear surface of the mobile terminal 100 and the other surface of the speaker frame 213 may face the display unit 151 located on the front surface of the mobile terminal 100. The sound hole 104a may be defined in the side case 104 as shown in FIG. 8. In this case, a sound bracket 230 for guiding the sound generated by the vibration of the diaphragm 211 to the sound hole 104a may be further included.

The motor 220 protrudes in the direction of the other surface more than the sound bracket 230. In addition, the motor 220 may be in contact with the rear surface of the display unit 151 as shown in FIG. 8. As the display unit 151 has recently become thinner, the display unit 151 itself may be used as the diaphragm 211 for outputting the sound. The display unit 151 without backlight, such as an OLED, may be implemented to be more thin, and a vibration generated while the weight 221 of the motor 220 vibrates may be transmitted to the display unit 151.

A bone conductive speaker may be implemented using the vibration of the display unit 151. When contacting an ear or a body part where a bone is located to the display unit 151, the user may hear the sound through the vibration of the display unit 151. That is, the sound may be heard through the vibration of the display unit 151 without defining the sound hole in the front surface, so that the size of the display unit 151 on the front surface may become larger as shown in FIG. 1B. In addition, conventional receiver and speaker may be implemented as a single module, so that there is an advantage that utilization of the internal space of the mobile terminal 100 may be increased.

When the motor frame 223 is in contact with the display unit 151, the speaker 210, i.e., the yoke 219, may be disposed to be in contact with the middle frame 105 supporting the rear surface of the display unit 151. An opening corresponding to the motor 220 is defined in the middle frame 105, so that the motor 220 may be in contact with the display unit 151 to transmit the vibration and the speaker 210 may be fixed and stably fastened to the middle frame 105.

Referring to FIG. 2A, the conventional speaker has a resonance hole 1519a defined in the yoke 1529, so that the sound generated by the vibration of the diaphragm 211 may resonate in a resonance space inside the mobile terminal 100 and be amplified. Air inside the speaker frame is able to flow fluidly through the resonance hole 1519a in response to the vibration of the diaphragm, so that a portion where the resonance hole 1519a is defined must be in communication with the resonance space. However, when the middle frame 105 and the yoke 219 are arranged to be in contact with each other like the motor-integrated audio output module 200 of the present disclosure shown in FIG. 8, even when the resonance hole is defined in the yoke 219, the resonance hole is blocked by the middle frame 105.

In order to solve the above problem, the motor-integrated audio output module 200 of the present disclosure may define a resonance hole 214 in the speaker frame 213 forming the side surface as shown in FIG. 3. The resonance hole 214 may be defined in a shape of a hole in the speaker frame 213, and the yoke 219 may cover an open end of a slot extending from the other side of the speaker frame 213 to implement the resonance hole 214.

However, when using the outer magnet 218b in a form of a closed ring as in the prior art, there is a disadvantage that a flow of the air to the resonance hole 214 defined in the side surface is not smoothly achieved. The motor-integrated audio output module 200 of the present disclosure composed of the plurality of outer magnets 218b may define the resonance hole 214 at a position corresponding to a portion where the outer magnet 218b is not disposed, that is, a space between adjacent two of the plurality of outer magnets 218b. Thus, the path of the sound generated by the diaphragm 211 is not obstructed.

When the outer magnets 218b are respectively arranged on the four sides as described above, the resonance holes 214 may be defined at the corners. Because the resonance hole 214 is defined laterally, even when the middle frame 105 and the yoke 219 are arranged to be in contact with each other, a quality of the sound is not affected.

Figure 9:
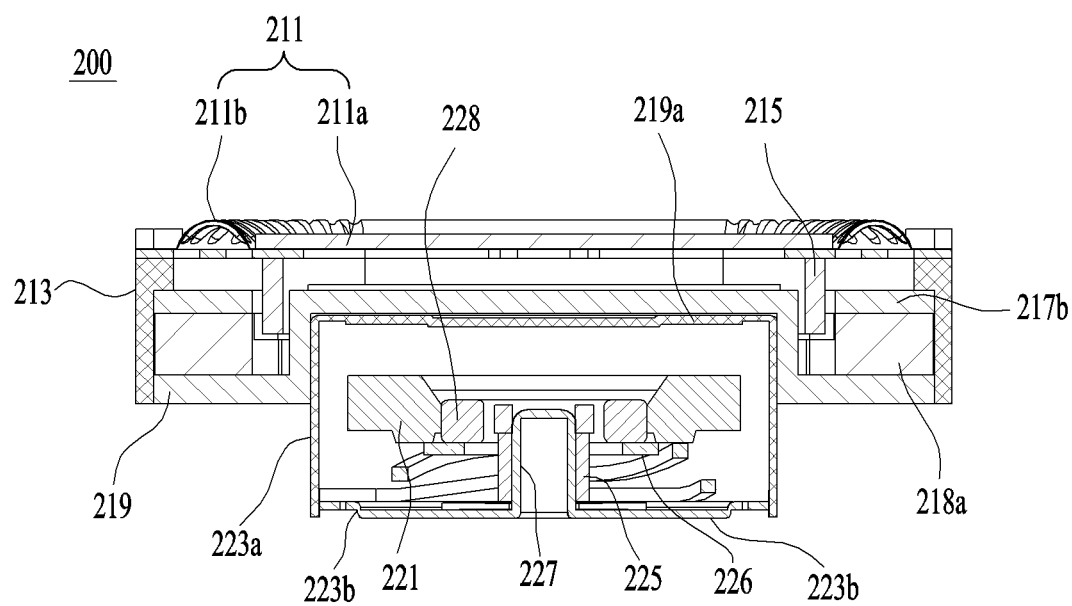
FIGS. 9 and 10 are cross-sectional views illustrating other embodiments of a motor-integrated audio output module of the present disclosure.
Figure 9:
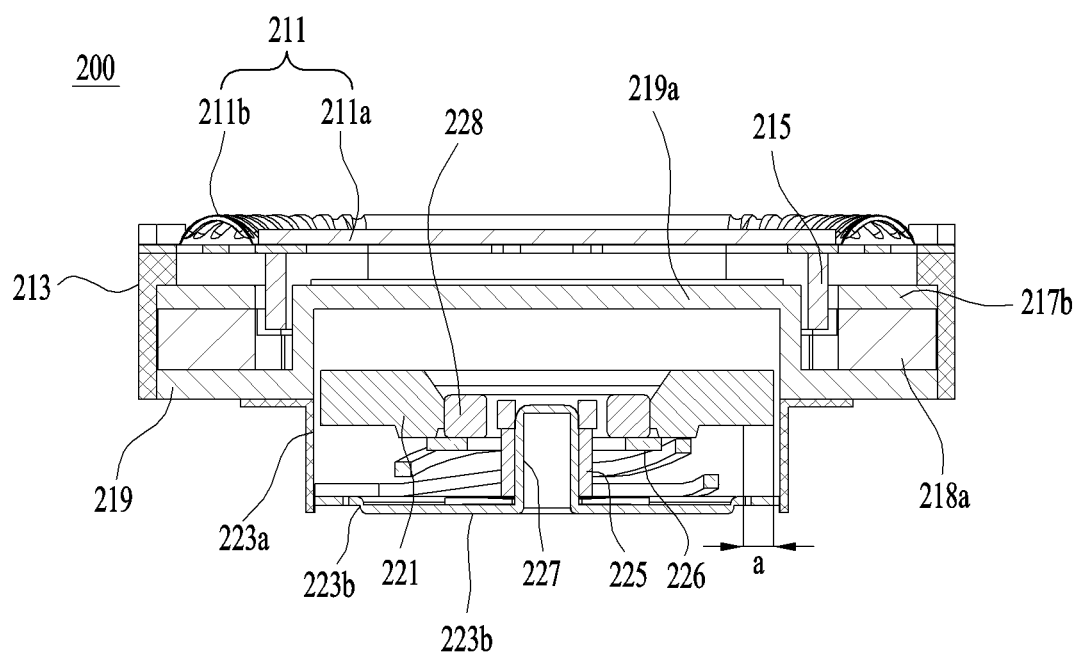
Figure 10:
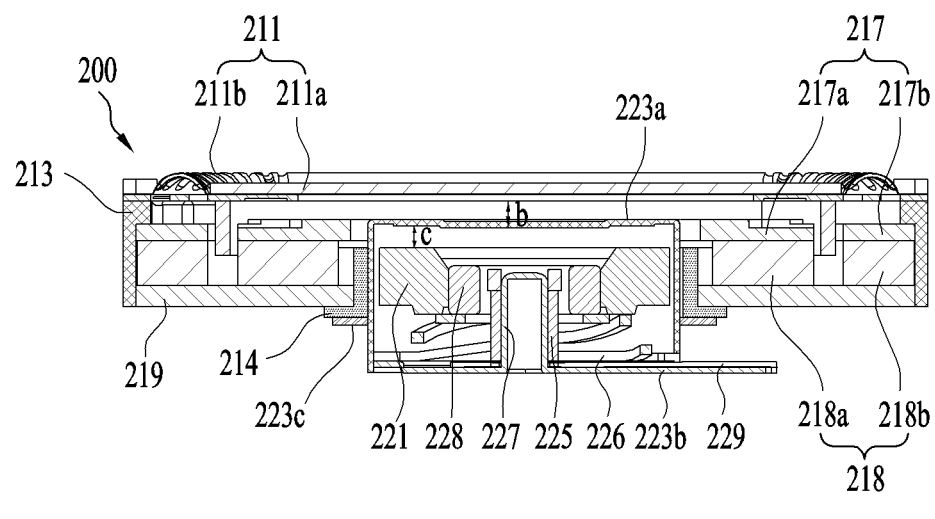
Figure 10:
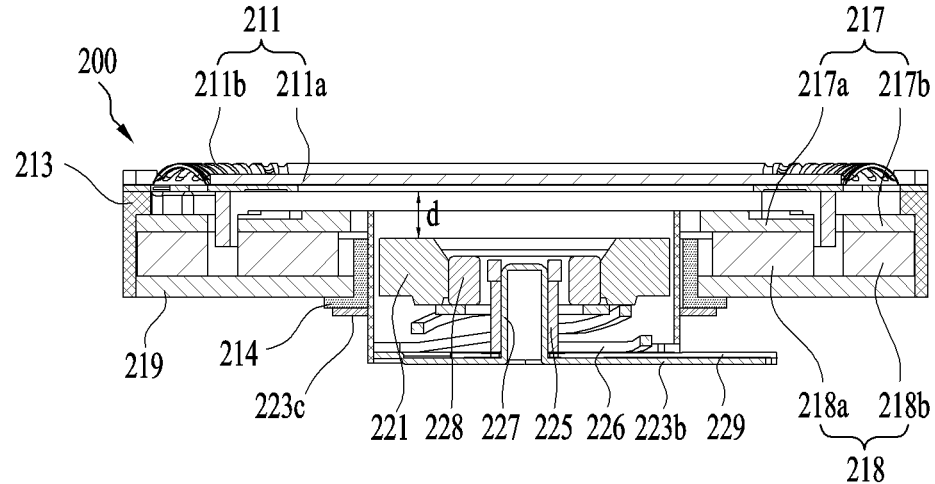

FIGS. 9 and 10 are cross-sectional views illustrating other embodiments of the motor-integrated audio output module 200 of the present disclosure. As shown in FIG. 9A, instead of defining the opening in the yoke 219, a motor groove 219a that is defined by concavely denting the yoke 219 may be defined, and the motor groove 219a and the motor 220 may be coupled to each other. There is no need to additionally dispose a motor fixing frame 214 for the coupling of the motor 220 and the speaker 210, and there is no need to dispose the wing 223c for limiting the position where the motor 220 is inserted.

In an embodiment shown in FIG. 9B, the motor frame 223 has a shape of a plate with open one side. That is, the motor frame 223 may be coupled to a perimeter of the motor groove 219a of the yoke 219 such that the motor groove 219a of the yoke 219 may be used as a portion of the motor frame 223. When an inner diameter of the motor frame 223 corresponds to a diameter of the motor groove 219a, an area of the motor frame 223 is reduced, thereby reducing a coast of the parts.

A space inside the motor frame 223 is limited because the motor frame 223 and the yoke 219 overlap each other or the motor fixed frame 214 and the motor frame 223 overlap each other. However, the inner diameter of the motor frame 223 of the present embodiment may be secured to be twice the a, and a radius of the weight 221 may be realized as large as a, so that an amplitude of the motor 220 may be large.

In the above-described embodiment, as shown in FIG. 10A, the motor 220 is surrounded by the motor frame, so that a vibration range b of the diaphragm 211 and a vibration range c of the motor magnet 228 and the weight 221 of the motor 220 are determined by a top surface of the motor frame 233. When the two vibration ranges are limited by the motor frame 233, a volume of the sound that is able to be output is limited. Thus, the top surface of the motor frame 233 may be omitted as shown in FIG. 10B, so that the vibration range of the diaphragm 211 and the vibration range of the motor magnet 228 and the weight 221 may be changed to be able to overlap with each other. Because the vibration range of the diaphragm 211 and a vibration range d of the motor magnet 228 and the weight 221 are increased, a larger output may be obtained without increasing the size of the motor-integrated audio output module 200.

In a normal situation where the sound output through the diaphragm 211 and the sound output through the motor 220 are individually achieved, there is no problem. However, when the vibration of the diaphragm 211 and the vibrations of the motor magnet 228 and the weight 221 occur at the same time, the diaphragm 211 may be bumped into the motor magnet 228 and the weight 221 during the vibration. In this case, the output is restricted to prevent the diaphragm from being damaged. The controller 181 may control power flowing through the voice coil 215 and power flowing through the motor coil 225 to adjust the output.

Figure 11:
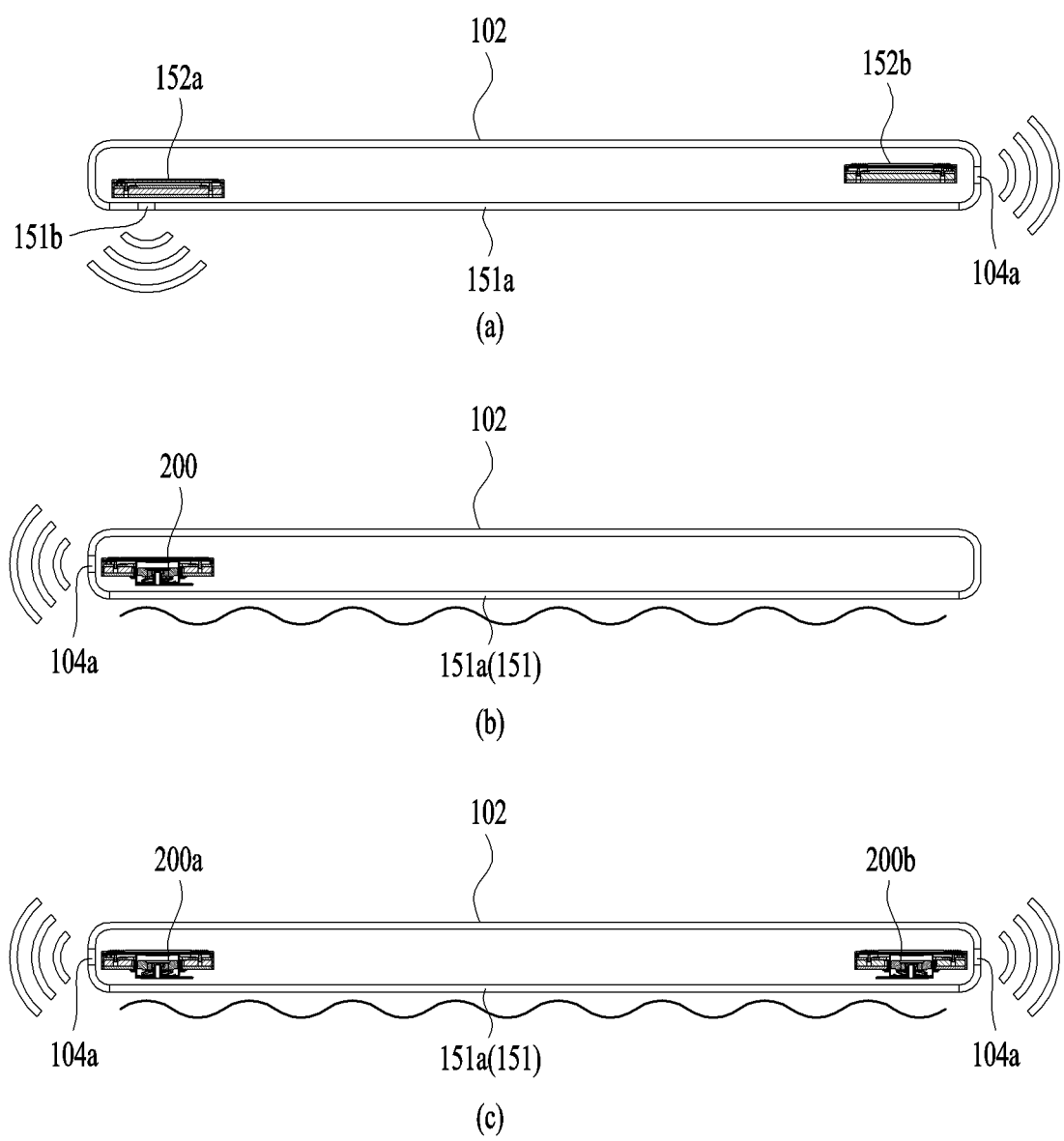
FIG. 11 is a view for illustrating an output direction of sound based on disposition of a motor-integrated audio output module.

FIG. 11 is a view for illustrating an output direction of sound based on disposition of the motor-integrated audio output module 200. FIG. 11A illustrates a structure of the conventional mobile terminal, which includes a receiver 152a for allowing the user to hear the sound by contacting the ear to the window 151a on the front surface during a call and a speaker 152b for allowing the user to hear the sound in a state in which the speaker 152b and the ear are spaced apart from each other.

The receiver 152a outputs the sound through the sound hole 151b defined in the window in the direction of the front surface of the mobile terminal, and the speaker 152b outputs the sound through the sound hole 104a defined in the front surface or the rear surface of the mobile terminal. When the receiver 152a is driven, the sound is output in the front surface direction, and when the speaker 152b is driven, the sound is output in the side surface or the rear surface direction. When two audio output modules 152a and 152b are driven at the same time, sound output in two directions is available, but outputs of the two audio output modules 152a and 152b are different from each other, so that a balanced sound output of a stereo mode is difficult.

FIG. 11B illustrates a sound output direction according to an embodiment of the present disclosure. When the diaphragm 211 of the motor-integrated audio output module 200 is vibrated, the sound may be output through the sound hole 104a defined in the side surface. Further, when the motor 220 is driven, the sound may be output while the display unit 151 and the window 151a vibrate.

Although the sound output by the vibration of the display unit 151 is output in the front surface direction like the conventional receiver, the sound hole defined in the front surface may be omitted. In addition, because an entirety of the display unit vibrates, the ear does not need to be placed at a specific position. In addition, because the entirety of the display unit 151 vibrates and outputs the sound, the volume of the sound is adjustable, so that louder sound is able to be output compared to the conventional receiver.

As shown in FIG. 11C, the plurality of motor-integrated audio output modules 200a and 200b may be arranged to output stereo sound. When only the receiver 152a is replaced with the motor-integrated audio output module 200a and the conventional speaker 152b is used without being omitted, the stereo sound may be output using the speaker 152b and the motor-integrated audio output module 200a.

The conventional mobile terminal 100 includes the speaker, the receiver, and the motor for allowing the user to hear the sound by placing the ear adjacent to the mobile terminal 100 for the call. However, the motor-integrated audio output module of the present disclosure may reduce a mounting space by implementing functions of the speaker, the receiver, and the motor using one module and may simplify a manufacturing process and reduce a manufacturing cost by reducing the number of parts.

The above detailed description should not be construed as limiting in all respects, but should be considered illustrative. The scope of the present disclosure should be determined by rational interpretation of the appended claims, and all changes within the equivalent scope of the present disclosure are included in the scope of the present disclosure.

The invention claimed is:

1. A electric device comprising:
    a case including a sound hole defined at one side thereof;
    a display unit coupled to a front surface of the case;

an audio output module located inside the case to be adjacent to the sound hole and coupled to a rear surface of the display unit; and a controller configured to output an image by controlling the display unit and output sound by controlling the audio output module, wherein the audio output module includes:

a speaker frame having one surface and the other surface;

a diaphragm coupled to the one surface of the speaker frame and vibrating to generate sound output to the sound hole;

a voice coil generating a vibration of the diaphragm;

a motor frame placed inside of the voice coil and coupled to the rear surface of the display unit a motor coil providing vibration to the display unit by vibrating the motor frame.

2. The electric device of claim 1, wherein the audio output module includes:

a yoke for covering the other surface of the speaker frame;

an outer magnet mounted on the speaker frame to be located outward of the voice coil;

an elastic portion having one side coupled to the motor frame; and a motor magnet coupled to the other side of the elastic portion, wherein the controller applies a signal to the motor coil to move the motor magnet, and wherein the motor frame vibrates according to the movement of the motor magnet, and wherein the display unit vibrates receiving the vibration of the motor frame.

3. The electric device of claim 2, further comprising:

a middle frame positioned inside the case to support the rear surface of the display unit, wherein the motor frame protrudes in the direction of the other surface of the speaker frame more than the yoke, and wherein the motor frame is inserted into an opening defined in the middle frame to be in contact with the display unit.

4. The electric device of claim 3, wherein the yoke is in contact with the middle frame.

5. The electric device of claim 4, further comprising:

a plurality of resonance holes defined in the speaker frame, wherein the outer magnet includes a plurality of outer magnets spaced apart from each other and arranged along an inner perimeter of the speaker frame, and wherein the resonance hole is defined at a position between adjacent two of the plurality of outer magnets.

6. The electric device of claim 2, wherein the audio output module has a rectangular shape with long-sides and short-sides, and wherein the electric device further includes a reinforcing magnet positioned between the voice coil and the motor frame in a direction of the long-side.

7. The electric device of claim 2, wherein the motor frame includes a shaft protruding in the direction of one surface, wherein the motor coil is wound around the shaft, and wherein the motor magnet is in a shape of a donut located outward of the motor coil.

8. The electric device of claim 2, wherein the yoke has an opening of a size corresponding to the motor frame defined therein, wherein the electric device further includes an injection molded portion for fastening the motor frame with the yoke, wherein the injection molded portion covers an outer circumference of the opening of the yoke, and wherein the motor frame further includes a wing protruding laterally and in contact with the injection molded portion to fix the motor frame.

9. The electric device of claim 2, wherein the yoke further includes a motor groove dented in a size corresponding to the motor frame, and wherein the motor frame is inserted into the motor groove.

10. The electric device of claim 2, wherein the yoke further includes a motor groove dented in a size corresponding to the motor, wherein one surface of the motor frame is opened, wherein the motor frame further includes a wing coupled to a circumference of the motor groove, and wherein the motor groove covers the open one surface of the motor frame.

11. The electric device of claim 10, further comprising:

a weight coupled to the motor magnet, wherein a size of the weight corresponds to a size of the motor groove.

12. The electric device of claim 1, wherein one surface of the motor frame facing the diaphragm is opened, and wherein the controller is configured to adjust voltages respectively applied to the voice coil and the motor coil to limit a vibration range of the diaphragm and a vibration range of a weight when power is applied to the voice coil and the motor coil at the same time.

13. The electric device of claim 1, wherein the sound hole includes at least two sound holes and the audio output module includes at least two audio output modules, and wherein the controller is configured to drive the plurality of audio output modules at the same time to output stereo sound.

* * * * *